Jan. 14, 1936.  M. CORNELL ET AL  2,027,518
LUBRICATING OIL TESTING APPARATUS
Filed Dec. 27, 1932  2 Sheets-Sheet 1
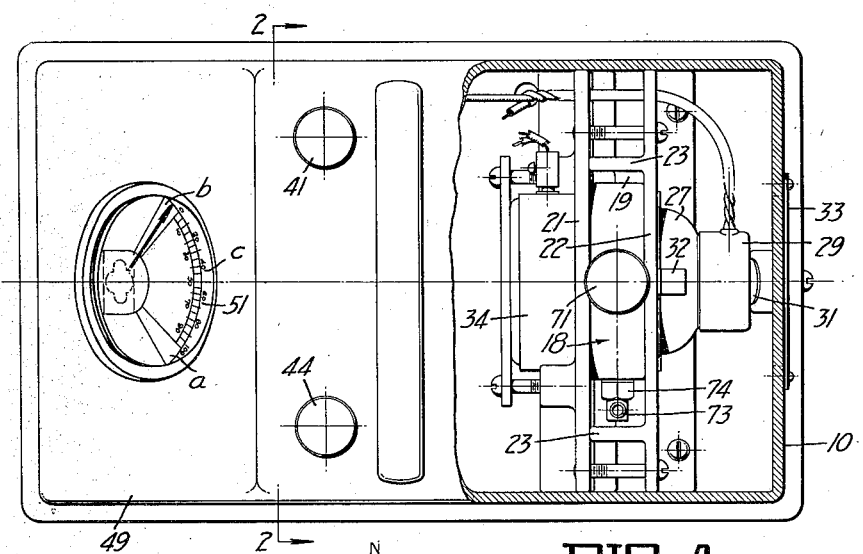
FIG.1_
FIG.2_
FIG.3_
FIG.4_
INVENTORS
*Mead Cornell*
*Charles C. Curtis*
BY *White, Prost, Flehr & Lothrop*
ATTORNEYS.
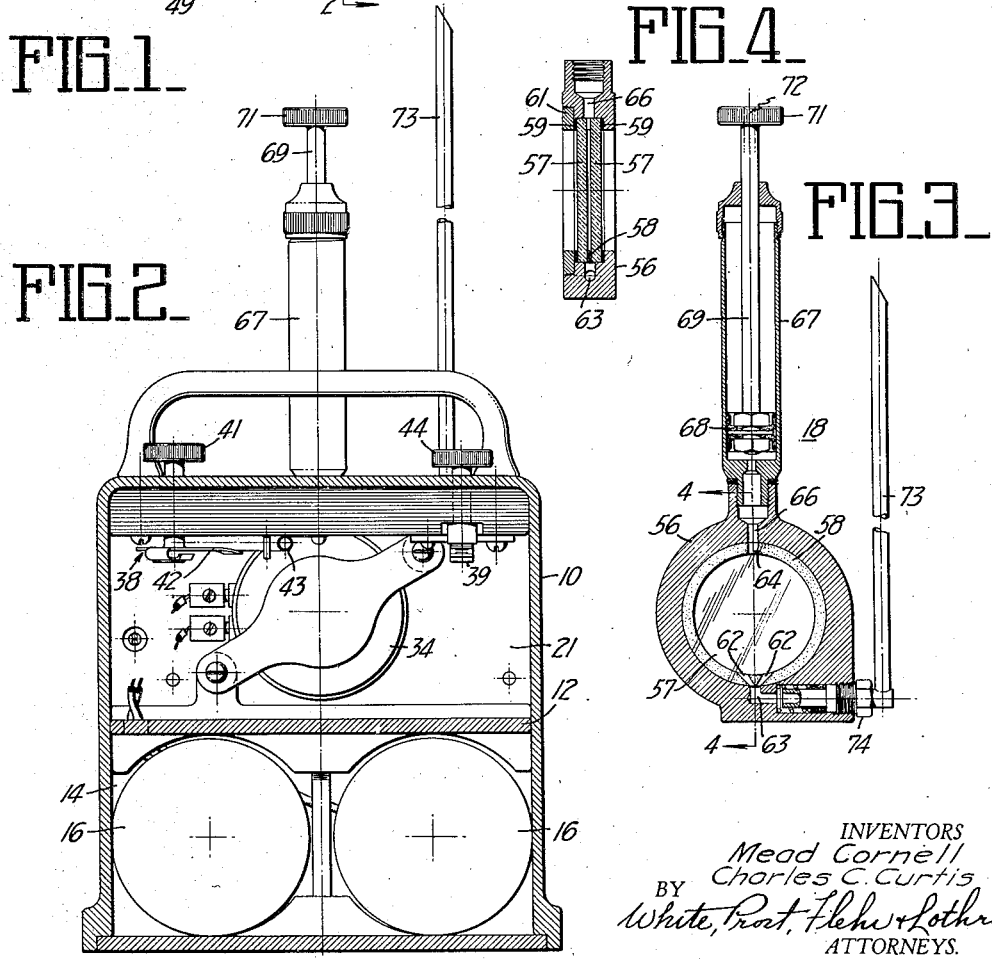

Jan. 14, 1936.   M. CORNELL ET AL   2,027,518
LUBRICATING OIL TESTING APPARATUS
Filed Dec. 27, 1932   2 Sheets-Sheet 2
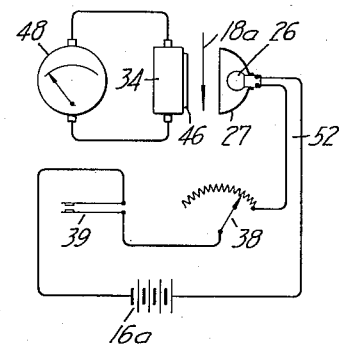
FIG_7_
FIG_6_
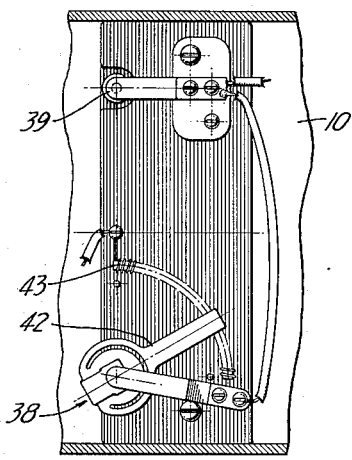
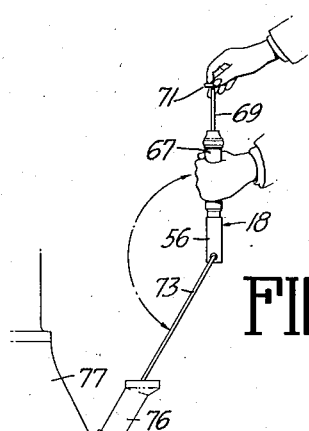
FIG_8_
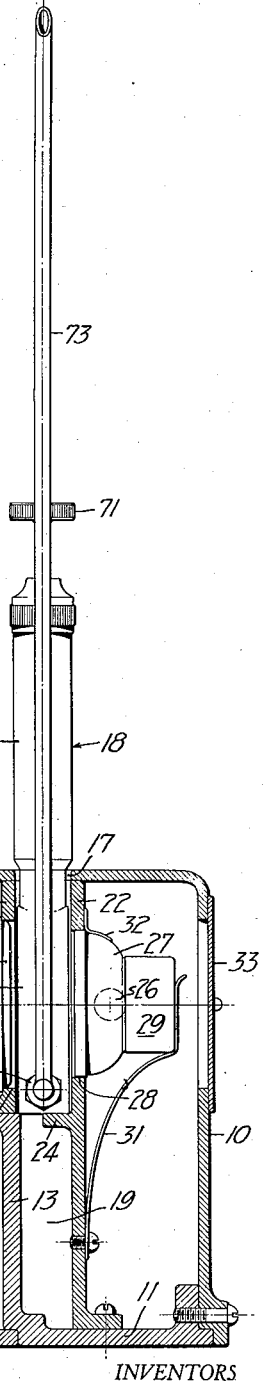
FIG_5_
INVENTORS
Mead Cornell
Charles C. Curtis
BY
White, Prost, Flehr & Lothrop
ATTORNEYS.

Patented Jan. 14, 1936

2,027,518

UNITED STATES PATENT OFFICE 2,027,518

LUBRICATING OIL TESTING APPARATUS

Mead Cornell, San Francisco, and Charles C. Curtis, San Leandro, Calif., assignors to Charles C. Broadwater, Oakland, Calif.

Application December 27, 1932, Serial No. 648,842

3 Claims. (Cl. 88—14)

This invention relates generally to methods and apparatus for determining certain properties or characteristics of petroleum products, particularly lubricating oils.

It is an object of the invention to provide a method and apparatus of the above character which will make it possible by a simple test, to determine the suitability of used lubricating oils for further service. In connection with this object, it is possible, by the use of our method and apparatus, to definitely determine when lubricating oils used in the crank cases of automobile motors or other internal combustion engines, should be changed. It is also possible to determine the relative value of different lubricating oil stocks for use in internal combustion engines, and assuming that the quality or value of a given lubricating oil is known, we can secure an indication of the condition of the engine in which the oil is being used.

It is a further object of the invention to provide a method and apparatus of the above character which is applicable for use in ordinary automobile filling stations, and which will make possible a substantially instantaneous indication of the condition of various lubricating oils.

Further objects of the invention will appear from the following description in which the preferred embodiment of the invention has been set forth in detail in conjunction with the accompany drawings.

Referring to the drawings:

Figure 1 is a plan view, with certain parts broken away, illustrating one form of our apparatus, which incorporates our method.

Fig. 2 is a cross sectional view taken along the line 2—2 of Fig. 1.

Fig. 3 is a side elevational view of the sampling device utilized as a part of my apparatus, certain parts being in cross section.

Fig. 4 is a cross sectional detail taken along the line 4—4 of Fig. 3.

Fig. 5 is a side elevational view of apparatus as shown in Fig. 1, in cross section.

Fig. 6 is a fragmentary detail, showing the rheostat utilized in controlling the supply of current to the electric lamp utilized, and also showing certain details of the electric switch used in conjunction therewith.

Fig. 7 is a circuit diagram showing the manner in which different parts of my apparatus are electrically connected.

Fig. 8 is a side elevational view, illustrating the manner in which a sample of oil is placed in our sampling device.

The method of our invention can be best understood after a detailed description of the apparatus illustrated in the drawings. As illustrated particularly in Figs. 1, 2, and 5, this apparatus is portable in form and consists of a housing 10 provided with a removable bottom wall 11. Partitions 12 and 13 (Fig. 5), arranged within the interior of the housing and carried by the bottom wall, serve to provide a compartment 14, for accommodating dry cells 16 or other form of electric batteries. The remainder of the interior of the housing serves to enclose other parts of the apparatus, as will be presently explained.

Formed in the top wall of housing 10, there is a lateral slot 17, which serves to receive what can be termed a "sampling device" 18. Prior to explaining a suitable detailed construction for this sampling device, it may be stated that it serves to retain a sample of oil in such a manner that a beam of light may be passed thru the same. In order to form a recess or pocket 19 extending downwardly from slot 17, a pair of vertical partitions 21 and 22 have been illustrated. Flanges 23 formed on partition 22, serve to define the vertical edges of recess 19. When positioned within recess 19, the sampling device 18 may rest upon a fixed shelf or stop such as a lug 24.

In the use of our apparatus a suitable source of light is caused to transmit a beam of light thru the sampling device 18, and the oil sample retained within the same, and is then caused to fall upon a photoelectric cell. To form a suitable source of light, we have shown an electric lamp globe 26 associated with a suitable reflector 27. The periphery of reflector 27 is positioned within an opening 28 formed in partition 22, so that the light will be transmitted directly upon a portion of the sampling device. To permit removal of reflector 27, thus enabling renewal of lamp 26, the base 29 of the reflector is shown retained in operating position by a spring strip 31. Likewise fingers 32, fixed to the reflector 27, serve to engage partition 22 about the opening 28. Removal of the reflector together with the lamp 26 can be facilitated by providing a removable closure 33, in the rear wall of housing 10.

Positioned upon the other side of sampling device 18, and carried by the partition 21, there is a suitable photoelectric cell 34. An opening 36 in partition 21, exposes that face of the cell 34 which is adapted to receive light rays.

In addition to the parts described above, which are mounted upon the housing 10, we provide a rheostat 38 and a switch 39, which are incorporated in an electrical circuit from dry cells 16, and which serve to control the supply of current to the lamp 26. Rheostat 38 may be of conventional type, and is shown with an external control knob 41. As illustrated it consists of a contact arm 42, operating upon an arcuate coiled resistor 43. Switch 39 can likewise be of conventional construction, and is shown provided with an external operating button 44, which when pressed downwardly serves to close the electrical circuit.

Interposed at some point between the lamp 26, and the electrical element or elements within photoelectric cell 34 which are light sensitive, we provide a proper light filter, having certain predetermined characteristics, as will be presently explained. In the construction shown in Fig. 5 this light filter has been indicated at 46, and extends over the front face of the photoelectric cell 34. However, it may be otherwise positioned, as for example between the lamp 26 and the sampling device 18, or it may be incorporated as a part of the sampling device. Likewise the filter may consist of a number of elements variously positioned to affect the light rays.

To operate in conjunction with the photoelectric cell 34, we provide suitable indicating means, which is preferably electrical in character. Due to the type of photoelectric cell which is preferably employed, this indicating means may consist simply of a microammeter 48, which is mounted within the housing in such a manner that its face is readable thru the housing and wall 49. As evident from Fig. 1, this microammeter may be provided with a special graduated scale 51, to more directly apprise the operator of the character of the oil being tested.

Suitable circuit connection for certain of the parts described above are illustrated in Fig. 7. In this instance battery 16a corresponds to the dry cells 16, and the electrical circuit 52 which includes this battery is connected to the electric lamp 26, in series with the rheostat 38 and the electrical switch 39. Meter 48 is directly connected to the terminals of the photoelectric cell 34. Sampling device 18, in its operating position during testing of a sample of oil, is represented by the arrow 18a.

It may be explained at this point that a proper type of photoelectric cell must be utilized, if the indicating means is to consist of a meter directly connected to the terminals of the same. Photoelectric cells capable of operation in this manner are available on the open market, and are commonly known as photronic photoelectric cells. They are generally constructed of anode and cathode elements, together with a light sensitive material upon the anode which is contacted by the cathode. When light rays fall upon the light sensitive materials, an electrical current is generated, which is capable of operating microammeter or like indicating instrument. As generally constructed such cells are responsive to a wide band of the light spectrum, including that portion of the spectrum corresponding to the natural colors of unused lubricating oil stocks, as well as to the red end of the spectrum.

A desirable form of sampling device has been illustrated in detail in Figs. 3 and 4. This device consists of a ring shaped body 56, carrying a pair of spaced parallel walls 57, which are formed of suitable light transmitting material, such as plate glass. The spacing between these plates should be comparatively accurate, and of small dimensions. For example a spacing of about 15/1000ths of an inch gives good results. Interposed between the plates 57 there is a gasket 58 formed of suitable material such as thin sheet metal, and which serves to secure accurate spacing. Gaskets 59 engage the outer peripheral edge portions of plates 57, and the plate assembly, together with the inner and outer gaskets, are clamped together in tight engagement by ring 61. To admit liquid into the space between plates 57, gasket 58 is provided with a pair of divergent slots 62, which communicate with the liquid passage 63. Likewise to apply suction to the space between plates 57, to cause inflow of liquid, gasket 58 is shown provided with a slot 64, which communicates with the liquid passage 66.

To provide suction means to be used in filling the sampling device with oil to be tested, we have shown a simple form of suction pump consisting of a barrel 67, the lower end of which is in communication with liquid passage 66. Slidably fitted within barrel 67 there is a piston 68, connected to the inner end of a tubular piston rod 69. Secured to the outer end of tube 69, there is an operating button or knob 71, which is provided with an aperture 72 communicating with the interior of tube 69. The passage thru tube 69, also communicates with the space below piston 68.

To facilitate withdrawing of a sample of oil from the crank case of an internal combustion engine, we provide an inlet tube 73, one end of which is provided with a swivel connection 74 to body 56. Thru this swivel connection, tube 73 is in communication with liquid passage 63.

The manner in which the sample device described above is utilized in securing a sample of oil from the crank case of an internal combustion engine is illustrated in Fig. 8. Filling tube 73 is swung downwardly and extended into the oil filling pipe or breather pipe 76, of the engine 77. The operator then places one finger over port 72, to close the same, and then raises button 71 to create a suction beneath piston 68. Thereupon oil immediately flows upwardly thru tube 73, and into the space between plates 57 thru liquid passage 63 and passages 62. Since passages 62 are divergent, the oil as it enters the space between plates 57 tends to swirl in opposite directions. When the space between plates 57 has been filled, the operator withdraws tube 73, and then by swinging this tube to a vertical position, the sample of oil so obtained is trapped within the device. Likewise with tube 73 in a vertical position, the entire sampling device can now be positioned within recess 19, as illustrated in Figs. 1, 2, and 5.

Before explaining the manner in which the apparatus described above is utilized in practice, it is necessary to amplify upon the manner in which the light from lamp 26, is filtered before effecting an electrical response. Since our apparatus is intended to be used to determine when lubricating oil is unfit for further service, or to determine the extent to which lubricating oil has been broken down thru use, the absorption of light rays by the sample of oil being tested, must be such as to indicate the presence of factors or ingredients in the oil, which appear due to a breakdown of the oil in use. When lubricating oil becomes broken down in use, certain ingredients invariably make their appearance, as for example certain solids such as carbon, which may be of colloidal fineness, and products of decomposition such as petrolic, naphthenic and other acids, and asphaltic residues. However various lubricating oil stocks, with which the apparatus may be used from time to time, have various natural color ingredients, and will therefore serve to absorb or filter certain light rays generated from an ordinary filament electric lamp, to varying degrees dependent upon the nature of the natural color ingredients present. Thus if a light filter of proper characteristics were not utilized with our apparatus, varying stocks of new oil, having different color characteristics, would afford decidedly different indications upon the meter 48. A desirable feature of the present invention is that by the use of a color filter of proper characteristics, the effect of varying natural colors of oil is made negligible. This has been made possible by the discovery that a filter can be provided which matches or is complementary to that band of the light spectrum corresponding to the various colors of the different unused lubricating oil stocks now available on the market.

In practice we utilize a color filter 46 which is absorptive with respect to the violets, blues and the major part of the green rays of the light spectra. It is evident that glass plates 57 of the sampling device, are likewise to a certain extent absorptive with respect to ultra-violet and violet rays. The band of the light spectra over which the filtering is thus effective, is substantially greater than the band represented by the natural colors of various lubricating oil stocks. However such a marginal overlap has been found desirable, to secure the desired result of rendering the apparatus substantially immune from the effect of varying natural colors. The effects secured by filtering the light in the manner just described, can also be explained by stating that the filtering renders the sample of the oil substantially transparent, insofar as various natural colors of different lubricating oil stocks are concerned. In practice good results have been secured by a filter having a cut-off towards the red end of the spectrum, of about 5800 as expressed in Angstroms units. In this connection we have found that the colors of various unused lubricating oils occupy a band terminating about 4800 as expressed in the same units.

We may now explain the manner in which our apparatus is utilized in practice. Assuming that the apparatus has not been utilized for some time, the operator first assures himself that lamp 26 will burn at a predetermined brilliancy. This is accomplished by pressing button 44, to illuminate lamp 26, while noting the indication of meter 48. The pointer of the meter should stop on a point within that portion of the scale indicated by letter a, which represents new or unused oil. If the pointer does not fall on that point of the scale, then the rheostat knob 41 is turned to vary the current supplied to the lamp, until the proper indication is secured. During this time the sampling device is within recess 19, and is empty and clean. The sampling device is now removed, a sample of oil drawn into the same, and the device then reintroduced into recess 19. The operator then again presses button 44, and notes the indication of meter 48. If the indication now falls within that portion of the scale marked by letter b, the oil has been broken down thru use beyond that point where the oil is suitable for lubricating purposes. However if the indication falls within that portion of scale marked by letter c, then the oil has become partially broken down, but is still capable of service.

In this connection it should be noted that the meter is so calibrated as to secure an indication which will directly indicate the condition of the oil with respect to its suitability for further use. For example when the lubricating oil is unfit for further use, due to the presence of ingredients previously referred to in amounts which render the oil unfit for lubricating purposes, the veiling effect or light absorptive properties of the oil sample are such that very little response is secured which accounts for the fact that the meter pointer will lie within the scale portion b. It has been found that broken down lubricating oil will have a marked veiling effect, even though it has been utilized in conjunction with an oil filter such as is commonly provided in automotive vehicles.

In addition to determining whether or not oil has been so broken down in use as to be unfit for further service, it is apparent that our invention can also be utilized to determine the comparative quality of oils, in terms of permissible useful period of lubrication. Likewise it can be employed to maintain a check upon the mechanical condition of an automotive vehicle. In this connection it has been found that when an internal combustion engine is not in good condition, the crank case lubricating oil will break down more rapidly than if the engine were in better operating condition.

It is evident that between subsequent tests, the sampling device should be cleansed by flushing the same with a suitable solvent, such as kerosene. During such flushing, the swirling movement imparted to the liquid entering the space between the glass plates, materially aids in removing adhering oil and solid particles.

It is evident that our invention is susceptible of modification, consistent with the state of the prior art. For example although a color filter is desirable when an ordinary filament type of lamp is utilized as a source of light, and when the photoelectric cell is responsive to a large portion of the light spectrum, it is believed possible to omit a special filter by utilizing a red emitter as a source of light rays, or by employing a photoelectric cell which is responsive only to the red end of the spectrum, in which event the color filter can be omitted.

We claim:

1. In apparatus for determining the lubricating quality of oil, a casing, a light sensitive cell mounted within the casing, indicating means connected to said cell, a source of light mounted within the casing and spaced with respect to the cell, a device for retaining a sample of oil, said device including a body provided with a pair of transparent walls spaced a predetermined distance apart whereby a relatively thin film of oil may be disposed between the same, and also including an inlet tube communicating with the space between the walls and suction means for drawing oil through the tube into the space between the transparent walls and for expelling the same back through the tube, one wall of the casing having an opening therethrough of sufficient size to permit introduction and removal of said device, and guide means disposed within the casing forming a recess communicating with said opening, the recess being disposed between said cell and the lamp, said guide means serving to position said device with said transparent walls between said cell and said lamp when the device is inserted through said opening, said device when so positioned serving to exclude access of exterior light through said opening whereby only light from the lamp passing through the transparent walls is received by the cell.

2. In apparatus for determining the lubricating quality of oil, a casing, a light sensitive cell mounted within the casing, indicating means associated with the casing and connected to said cell, a source of light likewise mounted within the casing and spaced with respect to the cell, guide means provided within the casing and serving to afford a recess between the cell and the lamp, one wall of the casing having an opening registering with said recess, and a device for retaining a sample of oil, said device including a body, a pair of transparent walls carried by the body and spaced a predetermined distance apart whereby a relatively thin film of oil may be disposed between the same, an inlet tube secured to the body and communicating with the space between the walls, and suction means for drawing oil through the tube into the space between the transparent walls and for expelling the same back through the tube under pressure, said tube having a latitude of swinging movement from a filling position in which it extends downwardly from the body, to a position in which it extends upwardly and alongside the body, said recess having a depth less than the length of said tube whereby it accommodates said device only when said tube is swung to a position extending alongside said body.

3. In apparatus for determining the lubricating quality of oil, a casing, a light sensitive cell mounted within the casing, indicating means associated with the casing and connected to said cell, a source of light likewise mounted within the casing and spaced with respect to the cell, guide means provided within the casing and serving to afford a downwardly extending recess between the cell and the lamp, an upper wall of the casing having an opening registering with said recess, and a device for retaining a sample of oil, said device including a body, a pair of transparent walls carried by the body and spaced a predetermined distance apart whereby a relatively thin film of oil may be disposed between the same, an inlet tube secured to the body and communicating with the space between the walls, and suction means for drawing oil through the tube into the space between the transparent walls and for expelling the same back through the tube under pressure, said tube having a latitude of swinging movement from a filling position in which it extends downwardly from the body, to a position in which it extends upwardly and alongside the body, said recess having a depth less than the length of said tube whereby it accommodates said device only when said tube is swung to a position extending alongside said body.

MEAD CORNELL.
CHARLES C. CURTIS.